United States Patent
Wang et al.

(10) Patent No.: US 11,212,795 B2
(45) Date of Patent: Dec. 28, 2021

(54) METHOD AND APPARATUS FOR INDICATING AND DETERMINING SLOT STRUCTURE

(71) Applicant: CHINA ACADEMY OF TELECOMMUNICATIONS TECHNOLOGY, Beijing (CN)

(72) Inventors: Lei Wang, Beijing (CN); Ekpenyong Tony, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 121 days.

(21) Appl. No.: 16/625,775

(22) PCT Filed: Jun. 20, 2018

(86) PCT No.: PCT/CN2018/092032
§ 371 (c)(1),
(2) Date: Dec. 23, 2019

(87) PCT Pub. No.: WO2018/233640
PCT Pub. Date: Dec. 27, 2018

(65) Prior Publication Data
US 2020/0128538 A1    Apr. 23, 2020

(30) Foreign Application Priority Data

Jun. 23, 2017  (CN) .......................... 201710486790.2
Aug. 11, 2017  (CN) .......................... 201710685486.0

(51) Int. Cl.
*H04W 72/04*    (2009.01)
*H04L 5/00*     (2006.01)
*H04W 72/14*    (2009.01)

(52) U.S. Cl.
CPC ....... *H04W 72/0446* (2013.01); *H04L 5/0007* (2013.01); *H04W 72/042* (2013.01); *H04W 72/14* (2013.01)

(58) Field of Classification Search
CPC .......... H04W 72/0446; H04W 72/042; H04W 72/14; H04L 5/0007
See application file for complete search history.

(56) References Cited

U.S. PATENT DOCUMENTS

2018/0227934 A1*  8/2018  Yang ................... H04W 72/121
2018/0376476 A1* 12/2018  Lee .................... H04W 72/0446
2020/0127760 A1*  4/2020  Jo ......................... H04W 76/11

FOREIGN PATENT DOCUMENTS

CN    102017759 A    4/2011
CN    104363975 A    2/2015

OTHER PUBLICATIONS

U.S. Appl. No. 62/500,557, corresponding to U.S. Appl. No. 62/500,557 A1, filed May 3, 2017. (Year: 2017).*

(Continued)

*Primary Examiner* — Melvin C Marcelo
(74) *Attorney, Agent, or Firm* — Kilpatrick Townsend & Stockton, LLP

(57) ABSTRACT

Disclosed are a method and apparatus for indicating and determining a slot structure, the method comprising: a base station determining a structure in a slot; the base station indicating, in a dynamic or semi-static manner, the structure in the slot to a terminal; receiving the structure in the slot indicated by the base station, in the dynamic or semi-static manner, to the terminal; and the terminal determining the structure of one or more slots according to the indicated slot structure. By means of the present invention, when a future mobile communication system needs to provide lower net- (Continued)

work delay and support richer service types, a slot structure supported by the system is more flexible and diverse.

18 Claims, 5 Drawing Sheets

(56) References Cited

OTHER PUBLICATIONS

R1-1803270, 'Summary on remaining issues on GC-PDCH carrying SFI', Qualcomm Inc., 3GPP TSG RAN WG1 #92, Feb. 26-Mar. 2, 2018, pp. 1-12. (Year: 2018).*
CATT "Configuration and monitoring of the group-common PDCCH", 3GPP TSG RAN WG1 Meeting #AH_NR2, Qingdao, P. R. China, Jun. 27-30, 2017, total 5 pages, R1-1710082.
LG Electronics "Discussion on the contents of group common PDCCH", 3GPP TSG RAN WG1 NR Ad Hoc #2, Qingdao, China Jun. 27-30, 2017, total 6 pages, R1-1710310.
Intel Corporation "Group-common PDCCH: Contents", 3GPP TSG RAN WG1 NR Ad-Hoc#2, Qingdao, P.R. China Jun. 27-30, 2017, total 6 pages, R1-1710548.
Catt, "Contents of the group-common PDCCH", 3GPP TSG RAN WG1 Meeting #AH_NR2, R1-1710081, Qingdao, P. R. China, Jun. 27-30, 2017.

* cited by examiner

METHOD AND APPARATUS FOR INDICATING AND DETERMINING SLOT STRUCTURE

This application is a US National Stage of International Application No. PCT/CN2018/092032, filed Jun. 20, 2018, which claims priority to Chinese Patent Applications No. 201710486790.2 and No. 201710685486.0, filed respectively on Jun. 23, 2017 and Aug. 11, 2017, entitled "Methods and Apparatuses for Indicating and Determining Slot Structure", which are hereby incorporated by reference in their entirety.

FIELD

The present disclosure relates to the technical field of wireless communications, and particularly to methods and apparatuses for indicating and determining a slot structure.

BACKGROUND

The mobile Internet is subverting a traditional mobile communication service mode, provides users with an unprecedented use experience, and has a profound impact on all aspects of work and life of people. The mobile Internet will promote a further upgrade of human social information interaction methods, and provides the users with a richer service experience in augmented reality, virtual reality, ultra high definition (3D) video, mobile cloud and the like. The further development of the mobile Internet will bring about a thousand-time increase in mobile traffic in the future, and promote a new round of changes in mobile communication technologies and industries. The Internet of Things (IoT) has expanded the scope of services of mobile communications, from human-to-human communication to intelligent interconnection between people and things as well as between things and things, which makes the mobile communication technology penetrate into a wider range of industries and fields. In the future, mobile medical, Internet of vehicles, smart home, industrial control, environmental monitoring and the like will promote explosive growth of IoT applications, and hundreds of billions of devices will access a network to achieve a real "Internet of Everything". Moreover, connection of massive devices and diversified IoT services will also bring a new technical challenge to the mobile communications.

With continuous emergence and enrichment of new service requirements, higher performance demands are placed on future mobile communication systems, such as higher peak rate, larger user experience rate, smaller delay, higher reliability, higher spectral efficiency and higher energy efficiency, more user accesses need to be supported, and various types of services are used. In order to support connection of a large number of all types of user equipments and different service types, flexible configuration of uplink and downlink resources has become a major trend in technology development. Future system resources may be divided into different sub-bands according to different services, and Transmission Time Intervals (TTIs) with different lengths are allocated on the sub-bands to meet various service requirements.

FIG. 1 is a schematic structural diagram of a frame structure type 1. As shown in the figure, a conventional Long Term Evolution (LTE) Frequency Division Duplex (FDD) system uses a frame structure type 1 (FS1), and its structure is as shown in FIG. 1. In the FDD system, the uplink and downlink transmissions are realized by using different carrier frequencies and the same frame structure. On each carrier, one radio frame with a length of 10 ms includes ten subframes with a length of 1 m, each subframe is divided into two slots having a length of 0.5 ms. The TTI duration of uplink and downlink data transmission is 1 ms.

FIG. 2 is a schematic structural diagram of a frame structure type 2. As shown in the figure, an existing LTE Time Division Duplex (TDD) system uses a frame structure type 2 (FS2), and its structure is as shown in FIG. 2. In the TDD system, the uplink and downlink transmissions are realized by using different subframes or different slots on the same frequency. Each radio frame with a length 10 ms in the FS2 is composed of two 5 ms half-frames, each of which contains five 1 ms subframes. The subframes in the FS2 are sorted into three categories: downlink subframes, uplink subframes and special subframes. Each special subframe includes three portions: a Downlink Pilot Time Slot (DwPTS), a Guard Period GP and an Uplink Pilot Time Slot (UpPTS). The DwPTS may transmit a downlink pilot, downlink service data and downlink control signaling. The GP does not transmit any signal. The UpPTS only transmits a random access signal and a Sounding Reference Symbol (SRS) and may not transmit uplink services or uplink control information. Each half-frame contains at least one downlink subframe, at least one uplink subframe, and at most one special subframe. The seven uplink and downlink configuration manners supported in the FS2 are as shown in Table 1.

TABLE 1

| Uplink-downlink configurations | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the exiting LTE system, the TTI is fixed to be 1 ms in length. For the FDD system, the uplink and downlink transmissions are realized by using different carrier frequencies and the same frame structure. For the TDD system, the subframes are sorted into the downlink subframes, the uplink subframes and the special subframes. The future mobile communication systems have a wider variety of services, and a slot needs to have a richer structure and a more flexible configuration to support different service demands. However, the shortcoming in the prior art is that there is currently no clear solution on how to indicate a structure of the slot.

SUMMARY

The present disclosure provides methods and apparatuses for indicating and determining a slot structure, so as to make the slot structure supported by a mobile communication system more flexible and diverse.

An embodiment of the present disclosure provides a method for indicating a slot structure, including:
determining, by a base station, a structure of a slot;
indicating, by the base station, the structure of the slot to a user equipment in a dynamic or semi-static manner.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink, and provided by the base station side.

In implementation, when the slot includes the uplink region and the downlink region, the uplink region is behind the downlink region; when the slot includes the downlink region and the unknown region, the unknown region is behind the downlink region; when the slot includes the uplink region and the unknown region, the unknown region is in front of or behind the uplink region; when the slot includes the uplink region, the downlink region and the unknown region, the downlink region is in front of the uplink region, and the unknown region is behind the downlink region and in front of the uplink region.

In implementation, the base station indicates the structure of the slot to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the base station schedules data to be transmitted in the unknown regions of the same or different slots through a Downlink Control Information (DCI) transmitted in the downlink region of the slot, and the data are uplink transmission and/or downlink reception.

In implementation, when the structure of the slot includes a plurality of possible combinations, the base station informs, through the higher layer signaling, the user equipment of M types of slot structures needed to be dynamically informed, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, the M types of slot structures needed to be dynamically indicated, the regions included in each type of slot structures and the number of the OFDM symbols included in each region are informed.

In implementation, when the base station indicates the structures of the slots to the user equipment in the semi-static manner, uplink and downlink structures of each slot within N ms are configured through the higher layer signaling, and N is a positive integer more than 0.

An embodiment of the present disclosure provides a method for determining a slot structure, including:
receiving a structure of a slot, indicated by a base station to a user equipment in a dynamic or semi-static manner; and
determining, by the user equipment, structures of one or more slots according to the indicated structure of the slot.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink, and provided by the base station side.

In implementation, when the slot includes the uplink region and the downlink region, the uplink region is behind the downlink region; when the slot includes the downlink region and the unknown region, the unknown region is behind the downlink region; when the slot includes the uplink region and the unknown region, the unknown region is in front of or behind the uplink region; when the slot includes the uplink region, the downlink region and the unknown region, the downlink region is in front of the uplink region, and the unknown region is behind the downlink region and in front of the uplink region.

In implementation, the base station indicates the structure to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the base station schedules data to be transmitted in the unknown regions of the same or different slots through a Downlink Control Information (DCI) transmitted in the downlink region of the slot, and the data are uplink transmission and/or downlink reception.

In implementation, when the structure of the slot includes a plurality of possible combinations, the user equipment acquires, according to a notification transmitted by the base station through the higher layer signaling, M types of slot structures needed to be dynamically informed, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, M types of slot structures needed to be dynamically indicated, the regions included in each type of slot structures and the number of the OFDM symbols included in each region are informed.

In implementation, when the base station indicates the structures of the slots to the user equipment in a semi-static manner, uplink and downlink structures of each slot within N ms are configured through the higher layer signaling, and N is a positive integer more than 0.

An embodiment of the present disclosure provides an apparatus for indicating a slot structure, including:

a structure determining device, configured to determine a structure of a slot in a base station; and an indicating device, configured to indicate the structure of the slot to a user equipment in a dynamic or semi-static manner in the base station.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink, and provided by the base station side.

In implementation, when the slot includes the uplink region and the downlink region, the uplink region is behind the downlink region; when the slot includes the downlink region and the unknown region, the unknown region is behind the downlink region; when the slot includes the uplink region and the unknown region, the unknown region is in front of or behind the uplink region; when the slot includes the uplink region, the downlink region and the unknown region, the downlink region appears in front of the uplink region, and the unknown region is behind the downlink region and in front of the uplink region.

In implementation, the indicating device is further configured to indicate the structure to the user equipment through a group common Physical Downlink Control Channel (PDCCH).

In implementation, the group common PDCCH carries control information targeting to a group of user equipment.

In implementation, when the indicating device further indicates structures of a plurality of slots through the group common PDCCH, the number N of the plurality of slots indicated through the group common PDCCH is informed by higher layer signaling. Furthermore, One group common PDCCH uses one slot format indication field that indicates the structures of the N slots. Or, the group common PDCCH uses N slot format indication fields that indicate the structures of the N slots, respectively.

In implementation, the indicating device is further configured to schedule data to be transmitted in the unknown regions of the same or different slots through a Downlink Control Information (DCI) transmitted in the downlink region of the slot, and the data are uplink transmission and/or downlink reception.

In implementation, the indicating device is further configured to inform, through the higher layer signaling, the user equipment of the slot structures needed to be dynamically informed when the structure of the slot includes a plurality of possible combinations.

In implementation, the indicating device is further configured to transmit indication information containing ceil (log2(M)) bits through the group common PDCCH, and informs the user equipment of one or more of the M types of slot structures.

In implementation, when the indicating device further informs, through the higher layer signaling, the M types of slot structures needed to be dynamically indicated, the regions included in each type of slot structures and the number of the OFDM symbols included in each region are informed.

In implementation, when the indicating device further indicates the structures in the slots to the user equipment in a semi-static manner, uplink and downlink structures of each slot within N ms are configured through the higher layer signaling, and N is a positive integer more than 0.

An embodiment of the present disclosure provides an apparatus for determining a slot structure, including:

a receiving device, configured to receive a structure of a slot, indicated by a base station to a user equipment in a dynamic or semi-static manner; and a slot determining device, configured to determine structures of one or more slots according to the indicated structure of the slot in the user equipment.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured to transmit downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink and provided by the base station side.

In implementation, when the slot includes the uplink region and the downlink region, the uplink region is behind the downlink region; when the slot includes the downlink region and the unknown region, the unknown region is behind the downlink region; when the slot includes the uplink region and the unknown region, the unknown region is in front of or behind the uplink region; when the slot includes the uplink region, the downlink region and the unknown region, the downlink region is in front of the uplink region, and the unknown region is behind the downlink region and in front of the uplink region.

In implementation, the receiving device is further configured to receive an indication transmitted by the base station to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the base station schedules data to be transmitted in the unknown regions of the same or different slots through a Downlink Control Information (DCI) in the downlink region of the slot, and the data are uplink transmission and/or downlink reception.

In implementation, the slot determining device is further configured to acquire, according to a notification transmitted by the base station through the higher layer signaling, M types of slot structures needed to be dynamically informed when the structure of the slot includes a plurality of possible combinations, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, M types of slot structures needed to be dynamically indicated, the regions included in each type of slot structures and the number of the OFDM symbols included in each region are informed.

In implementation, when the receiving device further receives the structures of the slots, indicated by the base station to the user equipment in the semi-static manner, uplink and downlink structures of each slot within N ms are configured through the higher layer signaling, and N is a positive integer more than 0.

The present disclosure has the following beneficial effects.

In the technical solutions provided by the embodiments of the present disclosure, the base station indicates the structure of the slot to the user equipment in the dynamic or semi-static manner, and the user equipment determines the structures of one or more slots according to the indicated structure of the slot. Therefore, when a future mobile communication system needs to provide a lower network delay and support a wider variety of services, the slot structures supported by the system are more flexible and diverse.

BRIEF DESCRIPTION OF THE DRAWINGS

Drawings described herein are used for providing further understandings of the present disclosure, and constitute one part of the present disclosure. Illustrative embodiments and descriptions thereof of the present disclosure are used for explaining the present disclosure, and do not constitute an improper limitation to the present disclosure. In the drawings.

DETAILED DESCRIPTION

Figure 1:
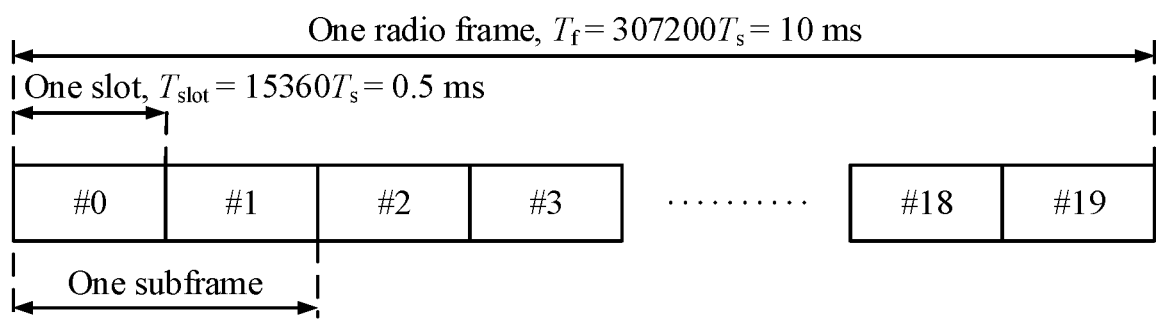
FIG. 1 is a schematic structural diagram of a frame structure type 1 in the prior art.
Figure 2:
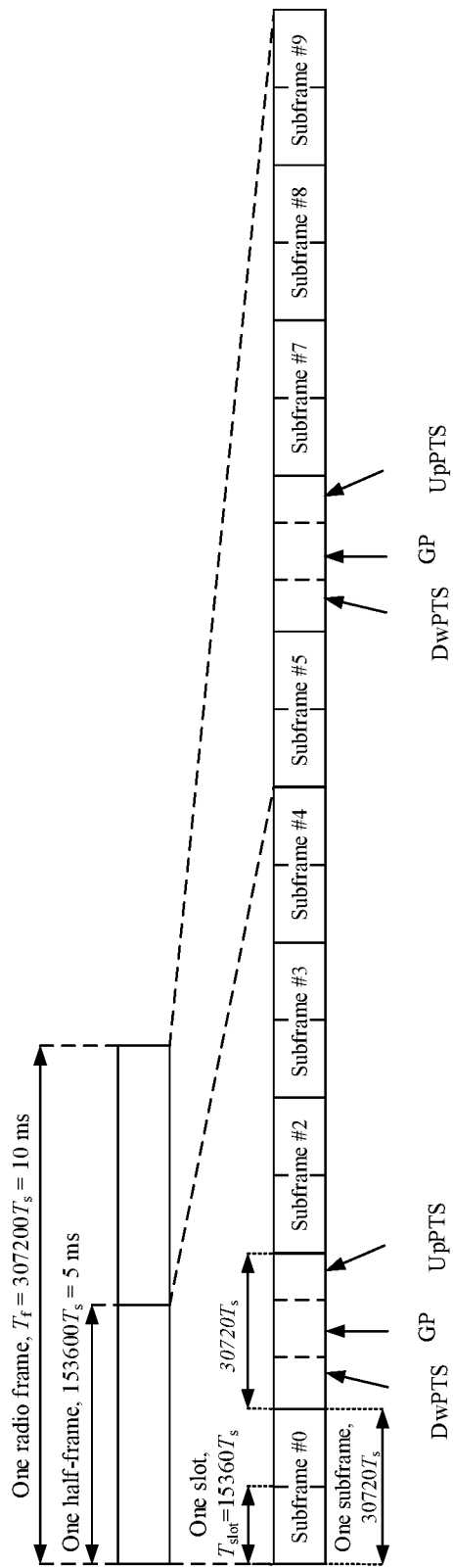
FIG. 2 is a schematic structural diagram of a frame structure type 2 in the prior art.

In order to make the objects, technical solutions and advantages of the embodiments of the present disclosure more clear, the technical solutions in the embodiments of the present disclosure will be described clearly and completely below in combination with the drawings in the embodiments of the present disclosure. Obviously, the embodiments described herein are only part of the embodiments of the present disclosure, not all the embodiments. Based on the embodiments in the present disclosure, all other embodiments acquired by those ordinarily skilled in the art without doing creative work shall fall within the protection scope of the present disclosure.

It should be understood that the technical solutions of the present disclosure may be applied to various communication systems, such as: a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a Universal Mobile Telecommunication System (UMTS), and a New Radio (NR).

It should be further understood that, in the embodiments of the present disclosure, User Equipment (UE) includes, but not limited to, a Mobile Station (MS), a Mobile User equipment, a Mobile Telephone, a handset, portable equipment and the like. The UE may communicate with one or more core networks via a Radio Access Network (RAN). For example, the UE may be a mobile telephone (or a "cellular" phone), a computer with a wireless communication function and the like. The UE may also be a portable, pocket-sized, handheld, computer built-in or in-vehicle mobile device.

In an embodiment of the present disclosure, a base station (e.g., an access point) may refer to equipment that communicates with a wireless user equipment through one or more sectors on an air interface in an access network. The base station may be configured to mutually convert a received air frame and an Internet Protocol (IP) packet, and is used as a router between the wireless user equipment and other portions of the access network. The other portions of the access network may include an IP network. The base station may further coordinate the attribute management of the air interface. For example, the base station may be a Base Transceiver Station (BTS) in the GSM or CDMA, or may be a base station (NodeB) in the TD-SCDMA or WCDMA, or may be an evolutional Node B (eNodeB or eNB or e-NodeB, evolutional Node B) in LTE, or a base station (gNB) in a 5G NR, and the present disclosure is not limited thereto.

In the LTE system, uplink and downlink structures in one subframe are fixed. For example, for the FDD system, one subframe may support both full uplink and full downlink. For the TDD system, Orthogonal Frequency Division Multiplex (OFDM) symbols in a subframe are all for uplink transmission or all for downlink transmission or contain DL\GP\UL. A specific slot structure is determined by a subframe configuration configured in higher layer signaling. With the development of mobile technologies, future mobile communication systems need to provide a lower network delay and support a wider variety of services. Slot structures to be supported by the system are also more flexible. There is currently no clear solution on how to indicate a structure of slot to a user equipment. Based on this, the embodiments of the present disclosure provide a solution that a base station indicates uplink and downlink structures in a slot in a dynamic or semi-static manner. The specific implementation of the present disclosure is described below in combination with the accompanying drawings.

In the description process, implementations respectively from a base station side and a user equipment side will be respectively described, and then examples in which the base station and the user equipment side are implemented together will be provided to better understand the implementations of the solutions provided in the embodiments of the present disclosure. Such a description manner does not mean that the base station and the user equipment must be implemented together or must be implemented separately. In fact, when the user equipment and the base station are implemented separately, the problems on the user equipment side and the base station side are solved respectively. When the user equipment and the base station are combined for use, better technical effects may be achieved.

Figure 3:
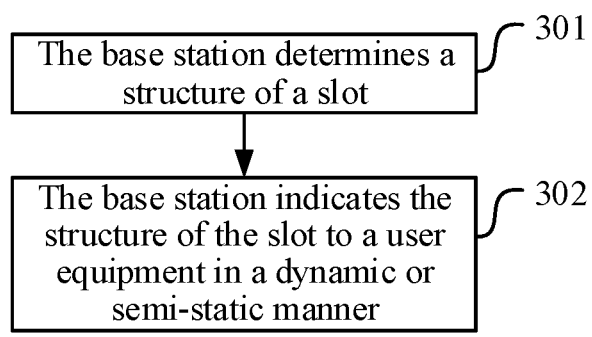
FIG. 3 is an implementation flow of a method for indicating a slot structure in an embodiment of the present disclosure.

FIG. 3 is an implementation flow of a method for indicating a slot structure. As shown in FIG. 3, the method may include the following steps.

Step 301: a base station determines a structure of a slot.

Step 302: the base station indicates the structure of the slot to a user equipment in a dynamic or semi-static manner.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols.

The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink and provided by the base station side.

Specifically, the structure of the slot may be defined as follows.

The possible structure regions of the slot includes, but not limited to, an uplink region, a downlink region, an unknown region, an empty region, a guard period and the like.

The uplink region includes one or more OFDM symbols, and only transmits uplink data. The downlink region includes one or more OFDM symbols, and only transmits downlink data. The unknown region includes one or more OFDM symbols; and the base station may perform related operations without any restrictions, but the user equipment side does not make any assumptions, and does not transmit and receive data on these OFDM symbols in the region before it receives UL grant or DL assignment sent by the base station. The empty region includes one or more OFDM symbols, and no data are transmitted on these symbols. At least one of the above regions exists in one slot.

In implementation, when the slot includes the uplink region and the downlink region, the uplink region is behind the downlink region. When the slot includes the downlink region and the unknown region, the unknown region is behind the downlink region. When the slot includes the uplink region and the unknown region, the unknown region is in front of or behind the uplink region. When the slot includes the uplink region, the downlink region and the unknown region, the downlink region appears in front of the uplink region, and the unknown region is behind the downlink region and in front of the uplink region.

In implementation, the base station indicates the structure of the slot to the user equipment through a group common Physical Downlink Control Channel (PDCCH).

In implementation, the group common PDCCH carries control information targeting to a group of user equipment.

Specifically, the base station may indicate the structures of one or more slots through the group common PDCCH.

The group common PDCCH carries control information targeting to one group of user equipment. That is, only specific UEs may receive the group common PDCCH.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots respectively.

Specifically, when structures of a plurality of slots are indicated through the group common PDCCH, the number N of the plurality of slots indicated by the group common PDCCH is informed through the higher layer signaling. The one group common PDCCH uses one slot format indication field that indicates the structures of the N slots. Or, the group common PDCCH uses N slot format indication fields that indicate the structures of the N slots, respectively.

In implementation, the slot format indication fields in the group common PDCCH indicate the unknown regions.

In implementation, the base station schedules data to be transmitted in the unknown regions of the same or different slots through a Downlink Control Information (DCI) in the downlink region of the slot, and the data are uplink transmission and/or downlink reception.

Specifically, the slot format indication fields in the group common PDCCH indicate the unknown regions.

The base station may transmit the DCI in the downlink region of the slot to schedule data to be transmitted in the unknown region, and the data are the uplink transmission and/or downlink reception. Specifically, the group common PDCCH indicates the slot formats of the slot n, the slot n+1, . . . , and the slot N, and the base station may schedule data to be transmitted in the unknown portion of the slot through the DCI.

In implementation, when the structure of the slot includes a plurality of possible combinations, the base station may also inform, through the higher layer signaling, the user equipment of M types of slot structures needed to be dynamically informed, and M is a natural number. For example, when there are M types of possible combinations, the slot structures needed to be dynamically informed include a slot structure 1, a slot structure 2, a slot structure 3, . . . , a slot structure N, and M is greater than N.

In implementation, the base station may further transmit indication information containing ceil(log2(M)) bits through the group common PDCCH, and inform the user equipment of the structures of one or more slots.

In implementation, when the base station may further inform, through the higher layer signaling, M types of slot structures needed to be dynamically indicated, the regions included in each type of slot structures and the number of the OFDM symbols included in each region are indicated.

In implementation, when the base station indicates the structures of the slots to the user equipment in the semi-static manner, uplink and downlink structures of each slot within N ms are configured through the higher layer signaling, and N is a positive integer more than 0.

Specifically, the uplink and downlink structures within 10 ms are configured through the higher layer signaling, and frame structures in the TD-LTE are contained.

In the specific implementation, the contained frame structures in the TD-LTE are as shown in Table 2 below

TABLE 2

| Frame structures in TD-LTE Subframe number | | | | | | | | | |
|---|---|---|---|---|---|---|---|---|---|
| 0 | 1 | 2 | 3 | 4 | 5 | 6 | 7 | 8 | 9 |
| D | S | U | U | U | D | S | U | U | U |
| D | S | U | U | D | D | S | U | U | D |
| D | S | U | D | D | D | S | U | D | D |
| D | S | U | U | U | D | D | D | D | D |
| D | S | U | U | D | D | D | D | D | D |
| D | S | U | D | D | D | D | D | D | D |
| D | S | U | U | U | D | S | U | U | D |

D represents downlink, and S represents DL, UL or GP, and U represents uplink.

Specifically, the base station configures the slot structures within a certain time period in the semi-static manner. The base station configures the uplink and downlink structures within 10 ms through the higher layer signaling, and the frame structures in the TD-LTE are at least contained, as shown in Table 2.

It should be understood that the implementation on the user equipment side corresponds to that on the base station side, so that the implementation on the user equipment side may refer to the implementation description on the base station side.

Specifically, the user equipment detects and receives the group common PDCCH according to a pre-defined time interval or a time interval informed by the base station.

The user equipment determines the structures of one or more slots according to slot structure indication information informed in the group common PDCCH.

The user equipment transmits the uplink data on the OFDM symbols indicated as the uplink regions, and receives the downlink data on the OFDM symbols indicated as the downlink regions. The user equipment does not make any assumptions on the OFDM symbols indicated as the unknown regions before receiving other indication information transmitted by the base station, and considers no data transmission on the OFDM symbols indicated as the empty regions.

Further, the user equipment receives the effective time or period, such as N slots, of the slot structure indication information carried by the group common PDCCH configured by the higher layer signaling, thereby determining the structures of the N slots.

Or, the user equipment determines the structures of the slots according to the semi-static configuration transmitted by the base station.

The user equipment determines structure information of slots within a certain period, such as structure information of slots within every 10 ms, according to configuration information carried in Radio Resource Control (RRC) signaling transmitted by the base station.

Descriptions are made below.

Figure 4:
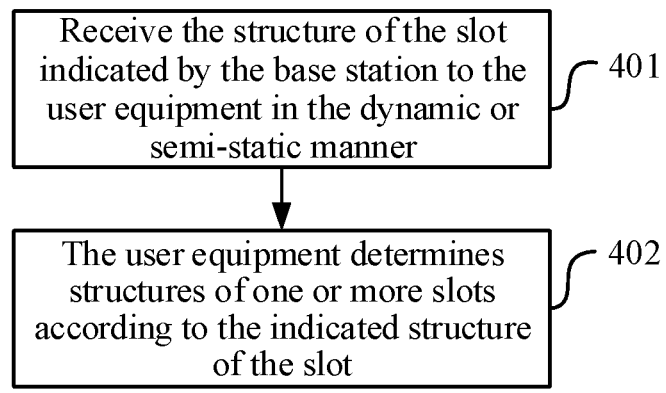
FIG. 4 is an implementation flow of a method for determining a slot structure on a user equipment side in an embodiment of the present disclosure.

FIG. 4 is an implementation flow of a method for determining a slot structure on a user equipment side. As shown in the figure, the method may include the following steps.

Step 401: Receive a structure of a slot, indicated by a base station to a user equipment in a dynamic or semi-static manner.

Step 402: the user equipment determines structures of one or more slots according to the indicated structure of the slot.

In implementation, the slot includes a structure of one or a combination of the following regions: an uplink region, a downlink region, an unknown region, an empty region and a guard period region, each region including one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink and provided by the base station side.

In implementation, when the slot includes the uplink region and the downlink region, the uplink region is behind the downlink region. When the slot includes the downlink region and the unknown region, the unknown region is behind the downlink region. When the slot includes the uplink region and the unknown region, the unknown region is in front of or behind the uplink region. When the slot includes the uplink region, the downlink region and the unknown region, the downlink region is in front of the uplink region, and the unknown region is behind the downlink region and in front of the uplink region.

In implementation, the base station indicates the structure to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the base station schedules data to be transmitted in the unknown regions of the same or different slots through a Downlink Control Information (DCI) transmitted in the downlink region of the slot, and the data are uplink transmission and/or downlink reception.

In implementation, when the structure of the slot includes a plurality of possible combinations, the user equipment acquires, according to a notification transmitted by the base station through the higher layer signaling, M types of slot structures needed to be dynamically informed, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, M types of slot structures needed to be dynamically indicated, the regions included in each type of slot structures and the number of the OFDM symbols included in each region are informed.

In implementation, when the base station indicates the structures in the slots to the user equipment in the semi-static manner, uplink and downlink structures of each slot within N ms are configured through the higher layer signaling, and N is a positive integer more than 0.

Specifically, the uplink and downlink structures within 10 ms are configured through the higher layer signaling, and frame structures in the TD-LTE are contained.

In the implementation, the contained frame structures in the TD-LTE are as shown below.

| Subframe number | | | | | | | | | |
|---|---|---|---|---|---|---|---|---|---|
| 0 | 1 | 2 | 3 | 4 | 5 | 6 | 7 | 8 | 9 |
| D | S | U | U | U | D | S | U | U | U |
| D | S | U | U | D | D | S | U | U | D |
| D | S | U | D | D | D | S | U | D | D |
| D | S | U | U | D | D | D | D | D | D |
| D | S | U | U | D | D | D | D | D | D |
| D | S | U | D | D | D | D | D | D | D |
| D | S | U | U | U | D | S | U | U | D |

D represents downlink, and S represents DL, UL or GP, and U represents uplink.

Descriptions are made below by examples.

Embodiment 1

It is assumed that the possible regions in the slot include: an uplink region, a downlink region, an unknown region, an empty region, a GP region and the like. The base station informs the structure information of one or more slots through the slot structure indication information carried by the group common PDCCH. The slot may include any combination of the above regions, and includes at least one of the above regions.

For example, the slot includes only the uplink region, or the slot includes only the downlink region, or the slot includes only the unknown region, or the slot includes only the empty region, or the slot includes only the GP region. When the slot includes a certain region, the corresponding region at least includes one OFDM symbol. When the slot includes both the downlink region and the uplink region, the downlink region is located in front of the uplink region.

It should be noted that when the slot includes the unknown region, the position of the unknown region may be as follows:

when the slot includes the unknown region and the downlink region, the unknown region may be only behind the downlink region;

when the slot includes the unknown region and the uplink region, the unknown region may be located in front of the uplink region or behind the uplink region;

when the slot includes the unknown region, the uplink region and the downlink region, the unknown region is located behind the downlink region and in front of the uplink region.

The uplink region may only transmit uplink data, and the downlink region only transmit downlink data, and the empty region does not transmit any data, and in the unknown region, the user equipment does not make any assumptions to data transmission in this region before receiving corresponding explicit signaling.

The base station indicates a region type included in the slot according to the indication information carried in the group common PDCCH, and the region type may be determined through the following mode.

The indication information indicates the region type included in the slot, and a duration of each region type, namely the number of occupied OFDM symbols. For example, one slot includes seven OFDM symbols, and each region type needs to be indicated by 3-bit information. It is assumed that there may be five region types in the slot, and the types of the slot need to be indicated by 15 bits.

Or, possible M slot types are stipulated in an agreement, as shown in a table below. It is assumed that there are seven slot types supported by the system, and three bits are needed for indication. Corresponding indication bit fields are as shown in Table 3 below.

Or, when the structure of the slot includes a plurality of possible combinations, the base station configures the slot types needed to be dynamically indicated through higher layer signaling in a semi-static manner. For example, the base station configures N slot types needed to be dynamically indicated through the higher layer signaling in the semi-static manner. In the present embodiment, it is assumed that N is equal to seven: S1, S2, S3, S4, S5, S6 and S7, respectively. Furthermore, the base station needs to indicate the region type included in each slot type, and the number of the OFDM symbols occupied by the region type. It is assumed that one slot includes seven OFDM symbols, similarly as shown in Table 4 below. It is assumed that S1 includes all downlink region; S2 includes all uplink regions; S3 includes three region types (4 DL, 1 unknown region and 2 UL); S4 includes three region types (5 DL, 1 unknown region and 1 UL); S5 includes three region types (2 DL, 3 unknown region and 2 UL); S6 includes two region types (4 DL and 3 unknown region); and S7 includes two region types (3 unknown region and 4 UL).

The base station further dynamically indicates the slot structures as one of the above structures through the indication information carried in the group common PDCCH. For example, the slot structures are indicated through the ceil($\log_2(M)$)=ceil($\log_2(7)$)=3 bits, specifically as shown in Table 4.

TABLE 3

| Bit field | Slot structure |
|---|---|
| 000 | All downlink |
| 001 | All uplink |
| 010 | DL + unknown + UL |
| 011 | Empty |
| 100 | DL + unknown |
| 101 | Unknown + UL or UL + unknown |
| 110 | DL + GP + UL |
| 111 | Reserved |

TABLE 4

| Bit field | Slot structure |
|---|---|
| 000 | All downlink |
| 001 | All uplink |
| 010 | 4 DL, 1 unknown, 2 UL |
| 011 | 5 DL, 1 unknown, 1 UL |
| 100 | 2 DL, 3 unknown, 2 UL |

TABLE 4-continued

| Bit field | Slot structure |
|---|---|
| 101 | 4 DL, 3 unknown |
| 110 | 3 unknown, 4 UL |
| 111 | Reserved |

The user equipment receives or transmits data according to the slot structures indicated by the indication information after receiving the corresponding slot structure indication information.

Embodiment 2

The base station configures the effective time of the slot structure indication information, informed by the group common PDCCH, through the higher layer signaling. When the effective time configured through the higher layer signaling includes N slots, the user equipment considers that the structures of the subsequent N slots are all the same as the slot structures indicated by the indication information after receiving the slot structure indication information indicated by the group common PDCCH.

Or, the effective time of the slot structure indication information indicated by the group common PDCCH is prior to the next time of correctly receiving the group common PDCCH.

Embodiment 3

The group common PDCCH needs to indicate the structure information of the N slots. Specifically, the group common PDCCH uses N indication information fields that indicate the structure information of the N slots, respectively. For example, when 3-bit information is needed to indicate the structure information of each slot, the group common PDCCH needs to carry 3*N bit information.

Embodiment 4

As described in the embodiments 1 to 3, the group common PDCCH indicates the structure information of a plurality of slots.

Figure 5:
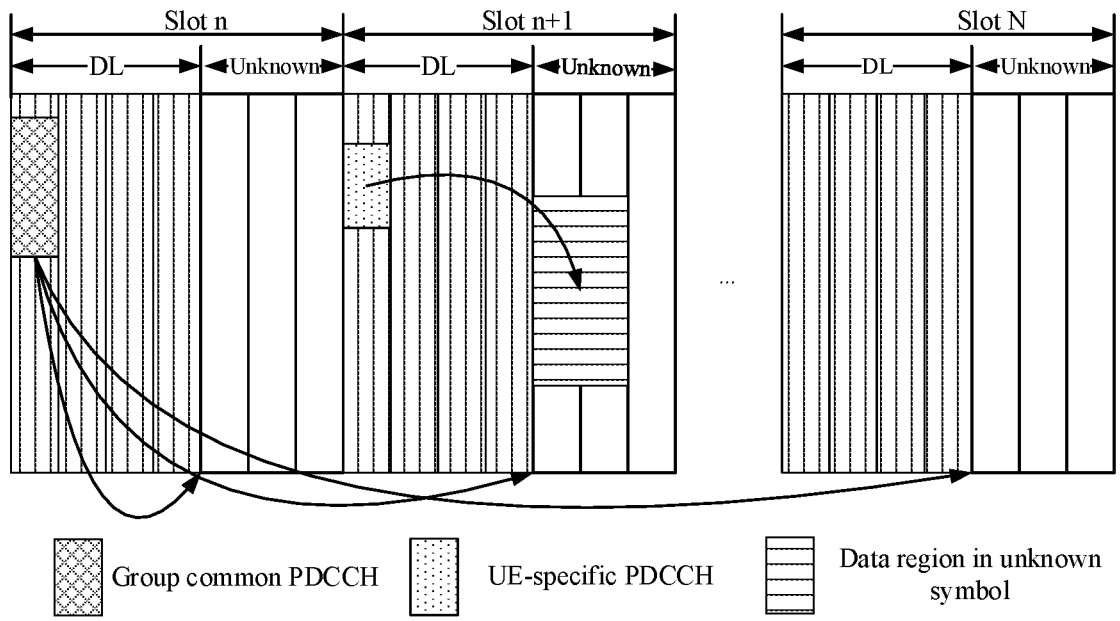
FIG. 5 is a schematic diagram of structure information of a slot of Embodiment 4 in an embodiment of the present disclosure.

For example, FIG. 5 is a schematic diagram of indication of structure information of the slots of Embodiment 4. As shown in the figure, the group common PDCCH transmitted in the slot n indicates the slot structure information of the slot n, the slot n+1, . . . , and the slot N. That is, the user equipment receives the slot structure indication information carried in the group common PDCCH in the slot n. The structure indication information indicates that the slot structure of the slot n, the slot n+1, . . . , and the slot N include the unknown regions. The base station may schedule the user equipment to transmit data in the unknown regions through a DCI which is used for scheduling user equipment data transmission and is transmitted on other PDCCH. The user equipment does not make any assumption to the unknown regions before receiving explicit indication signaling.

Embodiment 5

The base station configures the combinations of the M types of slot structures through the higher layer signaling (such as the RRC signaling). Each combination in the M types of slot structures includes N slots. N is a positive integer more than or equal to 1, and M is a positive integer more than or equal to 1. The base station transmits indication information of ceil(log2(M)) bits through the group common PDCCH. The indication information indicates one of the M types of slot combinations informed by the higher layer signaling. The slot combination at least includes one slot. The structure of each slot in the slot combination is not limited in this patent, but depends on the configuration of the base station.

Embodiment 6

The base station configures the structures of the slots through the higher layer signaling. One possible scene is that a new radio access technology (NR) is transmitted in a TD LTE (Time Division Synchronized Code Division Multiple Access Long Term Evolution (TD-SCDMA LTE)) band. In order to realize coexistence with the TD LTE system, the base station makes the structures, configured through the higher layer signaling, of the slots consistent with subframe configurations of a higher layer configuration in the TD LTE, thereby avoiding cross slot interference.

There are seven radio frame configurations in the TDD system, as shown in Table 5 below. An uplink-downlink configuration specifically used in the system is configured through the higher layer signaling, or is informed through a DCI format 1C. In order to realize coexistence with the TD LTE system, the NR base station configures the structures of the slots to be consistent with the following seven configurations through the higher layer signaling. For a specific example, the TD LTE system configures the uplink-downlink configuration used in the system as a configuration #0 through the higher layer signaling, and then the NR base station configures the structures of the slots within every 10 ms as below through the higher layer signaling as follows.

When the length of the slot includes seven OFDM symbols, the structures of 20 slots contained in 10 ms are (DDSSUUUUUUDDSSUUUUUU), and S is specifically configured according to the configuration of a special subframe used in the TDD system.

When the length of the slot includes 14 OFDM symbols, the structures of 10 slots contained in 10 ms are (DSUUU DSUUU), and S is specifically configured according to the configuration of a special subframe used in the TDD system.

TABLE 5

Radio frame configuration in TDD system

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 5-continued

Radio frame configuration in TDD system

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Based on the same disclosure concept, the embodiments of the present disclosure further provide an apparatus for indicating a slot structure and an apparatus for determining a slot structure. Since the principles of these apparatuses for solving the problems are similar to those of the method for indicating a slot structure and the method for determining a slot structure, implementations of these apparatuses may refer to the implementations of the methods, and no more repeated details will be described.

Figure 6:
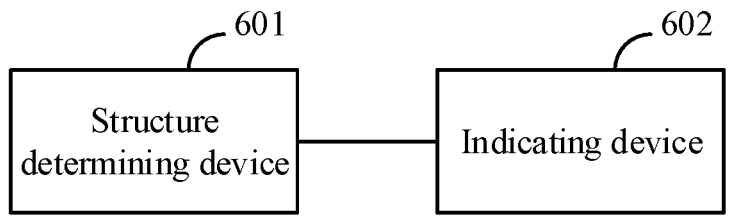
FIG. 6 is a schematic structural diagram of an apparatus for indicating a slot structure on a base station side in an embodiment of the present disclosure.

FIG. 6 is a structural schematic diagram of an apparatus for indicating a slot structure on a base station side. As shown in the figure, the apparatus may include:
a structure determining device 601, configured to determine a structure of a slot in a base station; and
an indicating device 602, configured to indicate the structure of the slot to a user equipment in a dynamic or semi-static manner in the base station.

In implementation, the slot includes a structure of one or a combination of the following regions: an uplink region, a downlink region, an unknown region, an empty region and a guard period region, each region containing one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions on the region and not transmit and receive data on the OFDM symbols in the region before it receives UL grant or DL assignment sent by the base station. The empty region is configured for transmission of no data. The guard period region is configured for conversion of downlink to uplink and provided by the base station side.

In implementation, when the slot includes the uplink region and the downlink region, the uplink region is behind the downlink region. When the slot includes the downlink region and the unknown region, the unknown region is behind the downlink region. When the slot includes the uplink region and the unknown region, the unknown region is in front of or behind the uplink region. When the slot includes the uplink region, the downlink region and the unknown region, the downlink region is in front of the uplink region, and the unknown region is behind the downlink region and in front of the uplink region.

In implementation, the indicating device is further configured to indicate the structure to the user equipment through a group common Physical Downlink Control Channel (PDCCH).

In implementation, the group common PDCCH carries control information targeting to a group of user equipment.

In implementation, when the indicating device further indicates structures of a plurality of slots through the group common PDCCH, the number N of the plurality of slots indicated through the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the slot format indication fields in the group common PDCCH indicate the unknown regions.

In implementation, the indicating device is further configured to schedule data transmitted in the unknown regions of the same or different slots through a Downlink Control Information (DCI) transmitted in the downlink region of the slot, and the data are uplink transmission and/or downlink reception.

In implementation, the indicating device is further configured to inform, through the higher layer signaling, the user equipment of M types of slot structures needed to be dynamically informed when the structure of the slot includes a plurality of possible combinations, and M is a natural number.

In implementation, the indicating device is further configured to transmit indication information containing ceil (log2(M)) bits through the group common PDCCH, and inform the user equipment of the structures of one or more slots.

In implementation, when the indicating device further informs, through the higher layer signaling, the M types of slot structures needed to be dynamically indicated, the regions contained in each type of slot structures and the number of the OFDM symbols contained in each region are informed.

In implementation, when the indicating device further indicates the structures in the slots to the user equipment in a semi-static manner, uplink and downlink structures of each slot within N ms are configured through the higher layer signaling, and N is a positive integer more than 0.

Figure 7:
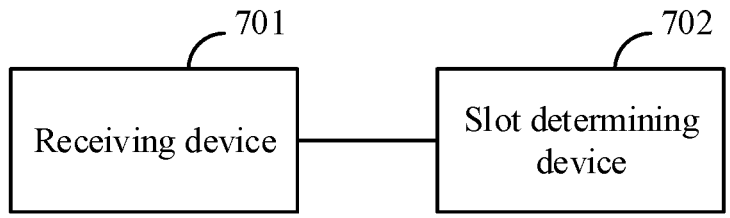
FIG. 7 is a schematic structural diagram of an apparatus for determining a slot structure on a user equipment side in an embodiment of the present disclosure.

FIG. 7 is a schematic structural diagram of an apparatus for determining a slot structure on a user equipment side. As shown in the figure, the apparatus may include:
a receiving device 701, configured to receive a structure of a slot, indicated by a base station to a user equipment in a dynamic or semi-static manner; and
a slot determining device 702, configured to determine structures of one or more slots according to the indicated structure of the slot in the user equipment.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions on the region and not transmit and receive data on the OFDM symbols in the region before it receives UL grant or DL assignment sent by the base station. The empty region is configured for transmission of no data. The guard period region is configured for conversion of downlink to uplink and provided by the base station side.

In implementation, when the slot includes the uplink region and the downlink region, the uplink region is behind the downlink region. When the slot includes the downlink region and the unknown region, the unknown region is behind the downlink region. When the slot includes the uplink region and the unknown region, the unknown region is in front of or behind the uplink region. When the slot includes the uplink region, the downlink region and the unknown region, the downlink region is in front of the uplink region, and the unknown region is behind the downlink region and in front of the uplink region.

In implementation, the receiving device is further configured to receive an indication transmitted by the base station to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the slot format indication fields in the group common PDCCH indicate the unknown regions.

In implementation, the base station schedules data to be transmitted in the unknown regions of the same or different slots through a Downlink Control Information (DCI) transmitted in the downlink region of the slot, and the data are uplink transmission and/or downlink reception.

In implementation, the slot determining device is further configured to acquire, according to a notification transmitted by the base station through the higher layer signaling, M types of slot structures needed to be dynamically informed when the structure of the slot includes a plurality of possible combinations, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, M types of slot structures needed to be dynamically indicated, the regions included in each type of slot structures and the number of the OFDM symbols included in each region are informed.

In implementation, when the receiving device further receives the structures of the slots, indicated by the base station to the user equipment in the semi-static manner, uplink and downlink structures of each slot within N ms are configured through the higher layer signaling, and N is a positive integer more than 0.

For convenience of description, the various parts of the above described apparatuses are described after being divided into various devices or units in terms of functions. Of course, the functions of the various devices or units may be implemented in one or more pieces of software or hardware during implementation of the present disclosure.

The technical solutions provided by the embodiments of the present disclosure may be implemented by the following mode.

Figure 8:
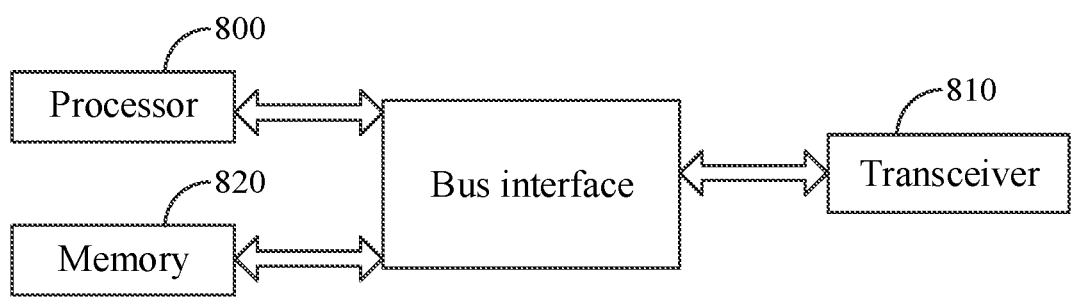
FIG. 8 is a schematic structural diagram of a base station in an embodiment of the present disclosure.

FIG. 8 is a schematic structural diagram of a base station. As shown in the figure, the base station includes:

a processor 800, configured to read a program in a memory 820 and perform the following process: determining a structure of a slot;

a transceiver 810, configured to receive and transmit data under the control of the processor 800, and perform the following process: indicating the structure of the slot to a user equipment in a dynamic or semi-static manner.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink and provided by the base station side.

In implementation, when the slot includes the uplink region and the downlink region, the uplink region is behind the downlink region. When the slot includes the downlink region and the unknown region, the unknown region is behind the downlink region. When the slot includes the uplink region and the unknown region, the unknown region is in front of or behind the uplink region. When the slot includes the uplink region, the downlink region and the unknown region, the downlink region is in front of the uplink region, and the unknown region is behind the downlink region and in front of the uplink region.

In implementation, the base station indicates the structure of the slot to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the slot format indication field in the group common PDCCH indicates the unknown region.

In implementation, the base station schedules data to be transmitted in the unknown regions of the same or different slots through a Downlink Control Information (DCI) transmitted in the downlink region of the slot, and the data are uplink transmission and/or downlink reception.

In implementation, when possible combinations of the structures in the slot, the base station informs, through the higher layer signaling, the user equipment of M types of slot structures needed to be dynamically informed, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, M types of slot structures needed to be dynamically indicated, the regions included in each type of slot structures and the number of the OFDM symbols included in each region are informed.

In implementation, when the base station indicates the structures of the slots to the user equipment in the semi-static manner, uplink and downlink structures of each slot within N ms are configured through the higher layer signaling, and N is a positive integer more than 0.

In FIG. 8, a bus architecture may include any number of interconnected buses and bridges, and is particularly formed by linking various circuits of one or more of processors represented by the processor 800 and memories represented by the memory 820 together. The bus architecture may also link various other circuits such as peripherals, voltage regulators and power management circuits, which are well known in the art and, therefore, will not be further described herein. A bus interface provides an interface. The transceiver 810 may be a plurality of elements, namely a transmitter and a receiver are included and units that communicate with various other apparatuses on a transmission medium are provided. The processor 800 is responsible for managing the bus architecture and performing usual processing, and the memory 820 may store data used when the processor 800 performs operations.

Figure 9:
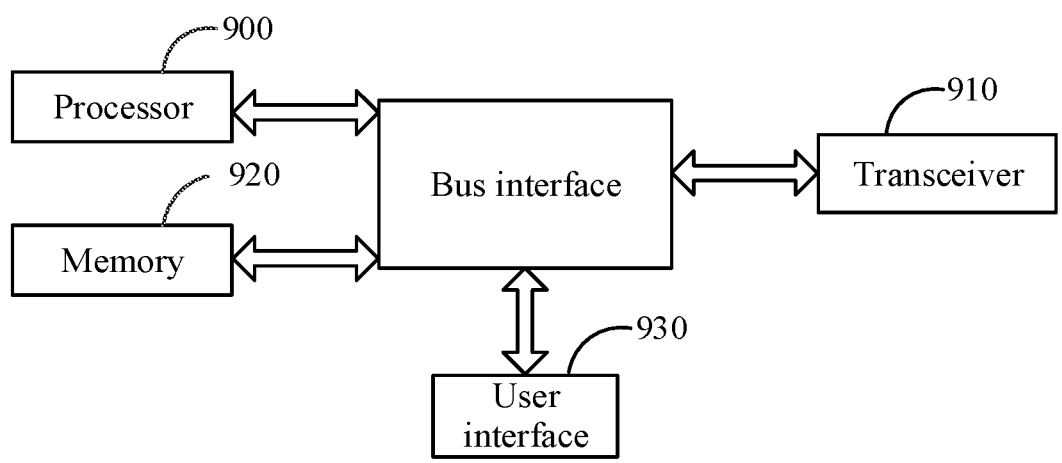
FIG. 9 is a schematic structural diagram of a user equipment in an embodiment of the present disclosure.

FIG. 9 is a schematic structural diagram of a user equipment. As shown in FIG. 9, the user equipment includes:
a transceiver 910, configured to receive and transmit data under the control of the processor 900, and perform the following process: receiving a structure of a slot, indicated by a base station to a user equipment in a dynamic or semi-static manner; and
a processor 900, configured to read a program in a memory 920 and perform the following process: determining structures of one or more slots according to the indicated structure of the slot.

In implementation, the slot includes a structure of one or a combination of the following regions: an uplink region, a downlink region, an unknown region, an empty region and a guard period region, each region includes one or more Orthogonal Frequency Division Multiplexing (OFDM) symbols. The uplink region is configured for transmission of uplink data. The downlink region is configured for transmission of downlink data. The unknown region is configured to allow the base station to perform related operations without any restrictions, and the user equipment side does not make any assumptions and not transmit and receive data on the OFDM symbols in the region before it receives UL grant or DL assignment sent by the base station. The empty region is configured for transmission of no data. The guard period region is configured for conversion of downlink to uplink and provided by the base station side.

In implementation, when the slot includes the uplink region and the downlink region, the uplink region is behind the downlink region. When the slot includes the downlink region and the unknown region, the unknown region is behind the downlink region. When the slot includes the uplink region and the unknown region, the unknown region is in front of or behind the uplink region. When the slot includes the uplink region, the downlink region and the unknown region, the downlink region is in front of the uplink region, and the unknown region is behind the downlink region and in front of the uplink region.

In implementation, the base station indicates the structure of the slot to the user equipment through a group common Physical Downlink Control Channel (PDCCH).

In implementation, the group common PDCCH carries control information targeting to a group of user equipment.

In implementation, when structures of a plurality of slots are indicated through the group common PDCCH, the number N of the plurality of slots indicated by the group common PDCCH is informed by higher layer signaling. Furthermore, one group common PDCCH uses one slot format indication field that indicates the structures of the N slots. Or, the group common PDCCH uses N slot format indication fields that indicate the structures of the N slots, respectively.

In implementation, the slot format indication field in the group common PDCCH indicates the unknown region.

In implementation, the base station schedules data to be transmitted in the unknown regions of the same or different slots through a Downlink Control Information (DCI) transmitted in the downlink region of the slot, and the data are uplink transmission and/or downlink reception.

In implementation, when the structure of the slot includes a plurality of possible combinations, the user equipment acquires, according to a notification transmitted by the base station through the higher layer signaling, M types of slot structures needed to be dynamically informed, and M is a natural number.

In implementation, the base station transmits indication information containing ceil(log2(M)) bits through the group common PDCCH, and informs the user equipment of the structures of one or more slots.

In implementation, when the base station informs, through the higher layer signaling, M types of slot structures needed to be dynamically indicated, the regions included in each type of slot structures and the number of the OFDM symbols included in each region are informed.

In implementation, when the base station indicates the structures in the slots to the user equipment in the semi-static manner, uplink and downlink structures of each slot within N ms are configured through the higher layer signaling, and N is a positive integer more than 0.

In FIG. 9, a bus architecture may include any number of interconnected buses and bridges, and is particularly formed by linking the various circuits of one or more of processors represented by the processor 900 and memories represented by the memory 920 together. The bus architecture may also link various other circuits such as peripherals, voltage regulators and power management circuits, which are well known in the art and, therefore, will not be further described herein. A bus interface provides an interface. The transceiver 910 may be a plurality of elements, namely a transmitter and a receiver are included and units that communicate with various other apparatuses on a transmission medium are provided. For different UE, a user interface 930 may be an interface capable of externally and internally connecting desired devices, and the connected devices include, but not limited to, a keypad, a display, a speaker, a microphone, a joystick, and the like.

The processor 900 is responsible for managing the bus architecture and performing usual processing, and the memory 920 may store data used when the processor 900 performs operations.

Based on the above, in the technical solutions provided by the embodiments of the present disclosure, the base station dynamically indicates the structures of one or more slots through the group common PDCCH, or the base station configures the structures of one or more slots in the semi-static manner.

The base station may schedule, through the UE-specific DCI, the user equipment to transmit data in the unknown regions.

Therefore, a solution for indicating a slot structure is provided, and configured to make the slot structures supported by the system more flexible and diverse when a future mobile communication system needs to provide a lower network time delay and support a wider variety of services.

Those skilled in the art should understand that the embodiments of the present disclosure may provide a method, a system or a computer program product. Therefore, the present disclosure may adopt the form of a complete hardware embodiment, a complete software embodiment, or a software and hardware combination embodiment. In addition, the present disclosure may adopt the form of a computer program product implemented on one or multiple computer-sensitive storage media (including, but not limited to, a magnetic disk memory, a Compact Disc Read-Only Memory (CD-ROM), an optical memory and the like) including computer-sensitive program codes.

The present disclosure is described by referring to flow diagrams and/or block diagrams of methods, devices (systems) and computer program products according to the embodiments of the present disclosure. It should be understood that computer program instructions may implement each flow and/or each block in the flow diagrams and/or the block diagrams and combination of the flows and/or the blocks in the flow diagrams and/or the block diagrams. These computer program instructions may be provided for a general computer, a dedicated computer, an embedded processor or processing units of other programmable data processing devices to generate a machine, thereby making the instructions that are executed by the computer or the processing units of other programmable data processing devices generate apparatuses for realizing specified functions in one or multiple flows of the flow diagrams and/or one or multiple blocks of the block diagrams.

These computer program instructions also may be stored in a computer readable memory capable of guiding the computer or other programmable data processing devices to work in a specific manner, thereby making the instructions that are stored in the computer readable memory generate manufactured products that include instruction apparatuses. The instruction apparatuses realize the specified functions in one or multiple flows of the flow diagrams and/or one or multiple blocks of the block diagrams.

These computer program commands also may be loaded onto the computer or other programmable data processing devices to execute a series of operation steps on the computer or other programmable data processing devices to generate computer implemented processing, so that the instructions executed on the computer or other programmable data processing devices provide steps for realizing the specified functions in one or multiple flows of the flow diagrams and/or one or multiple blocks of the block diagrams.

Although the embodiments of the present disclosure have been described, those skilled in the art can make other changes and modifications to these embodiments once they acquire the basic creative concept. Therefore, attached claims is intended to be explained as including the embodiments and all the changes and modifications that fall within the scope of the present disclosure.

Obviously, those skilled in the art can make various changes and transformations to the embodiments of the present disclosure without departing from the spirit and scope of the present disclosure. Therefore, if these changes and transformations of the embodiments of the present disclosure fall within the scope of the claims of the present disclosure and equivalent technologies of the present disclosure, the present disclosure is intended to include these changes and transformations.

What is claimed is:

1. A method for indicating a slot structure, comprising:
   determining, by a base station, a structure of a slot;
   indicating, by the base station, the structure of the slot to a user equipment in a dynamic or semi-static manner;
   wherein the slot comprises a structure of one or a combination of the following regions: an uplink region, a downlink region, an unknown region, an empty region and a guard period region, each region comprising one or more Orthogonal Frequency Division Multiplexing (OFDM) symbols; wherein:
   the uplink region is configured for transmission of uplink data;
   the downlink region is configured for transmission of downlink data;
   the unknown region is configured to allow the base station to perform related operations without any restrictions, and the user equipment side does not make any assumptions and not transmit and receive data on the OFDM symbols in the region before it receives Uplink (UL) grant or Downlink (DL) assignment sent by the base station;
   the empty region is configured for transmission of no data; and
   the guard period region is configured for conversion of downlink to uplink, and provided by the base station side.

2. The method according to claim 1, wherein when the slot comprises the uplink region and the downlink region, the uplink region is behind the downlink region;
   when the slot comprises the downlink region and the unknown region, the unknown region is behind the downlink region;
   when the slot comprises the uplink region and the unknown region, the unknown region is in front of or behind the uplink region; and
   when the slot comprises the uplink region, the downlink region and the unknown region, the downlink region is in front of the uplink region, and the unknown region is behind the downlink region and in front of the uplink region.

3. The method according to claim 1, wherein the base station indicates the structure of the slot to the user equipment through a group common Physical Downlink Control Channel (PDCCH); and
   the group common PDCCH carries control information targeting to a group of user equipment.

4. The method according to claim 3, wherein when structures of a plurality of slots are indicated through the group common PDCCH, the number N of the plurality of slots indicated by the group common PDCCH is informed by higher layer signaling; and
one group common PDCCH uses one slot format indication field indicating the structures of the N slots;
or, the group common PDCCH uses N slot format indication fields indicating the structures of the N slots respectively.

5. The method according to claim 3, wherein the base station schedules data to be transmitted in the unknown regions of same or different slots through a Downlink Control Information (DCI) transmitted in the downlink region of the slot, wherein the data are uplink transmission and/or downlink reception.

6. The method according to claim 3, wherein when the structure of the slot comprises a plurality of possible combinations, the base station informs, through the higher layer signaling, the user equipment of M types of slot structures needed to be dynamically informed, and M is a natural number.

7. The method according to claim 6, wherein the base station transmits indication information containing ceil(log2 (M)) bits through the group common PDCCH, and informs the user equipment of the structures of one or more slots; and
when the base station informs, through the higher layer signaling, M types of slot structures needed to be dynamically indicated, the base station informs the regions included in each type of the slot structures and the number of the OFDM symbols included in each region.

8. The method according to claim 1, wherein when the base station indicates the structure of the slot to the user equipment in the semi-static manner, the base station configures uplink and downlink structures of each slot within N ms through the higher layer signaling, and N is a positive integer more than 0.

9. A method for determining a slot structure, comprising: higher layer signaling, and N is a positive integer more than 0;
receiving a structure of a slot, indicated by a base station to a user equipment in a dynamic or semi-static manner; and
determining, by the user equipment, structures of one or more slots according to the indicated structure of the slot;
wherein the slot comprises a structure of one or a combination of the following regions: an uplink region, a downlink region, an unknown region, an empty region and a guard period region, each region comprising one or more Orthogonal Frequency Division Multiplexing (OFDM) symbols; wherein:
the uplink region is configured for transmission of uplink data;
the downlink region is configured for transmission of downlink data;
the unknown region is configured to allow the base station to perform related operations without any restrictions, and the user equipment side does not make any assumptions and not transmit and receive data on the OFDM symbols in the region before it receives Uplink (UL) grant or Downlink (DL) assignment sent by the base station;
the empty region is configured for transmission of no data; and
the guard period region is configured for conversion of downlink to uplink, and provided by the base station side.

10. The method according to claim 9, wherein when the slot comprises the uplink region and the downlink region, the uplink region is behind the downlink region;
when the slot comprises the downlink region and the unknown region, the unknown region is behind the downlink region;
when the slot comprises the uplink region and the unknown region, the unknown region is in front of the uplink region or behind the uplink region; and
when the slot comprises the uplink region, the downlink region and the unknown region, the downlink region is in front of the uplink region, and the unknown region is behind the downlink region and in front of the uplink region.

11. The method according to claim 9, wherein the base station indicates the structure of the slot to the user equipment through a group common Physical Downlink Control Channel (PDCCH); and
the group common PDCCH carries control information targeting to a group of user equipment.

12. The method according to claim 11, wherein when structures of a plurality of slots are indicated through the group common PDCCH, the number N of the plurality of slots indicated by the group common PDCCH is informed by higher layer signaling; and
one group common PDCCH uses one slot format indication field indicating the structures of the N slots;
or, the group common PDCCH uses N slot format indication fields indicating the structures of the N slots respectively.

13. The method according to claim 11, wherein the user equipment transmits or receives data in the unknown regions of the same or different slots based on a Downlink Control Information (DCI) transmitted by the base station in the downlink region of the slot.

14. The method according to claim 11, wherein when the structure of the slot comprises a plurality of possible combinations, the user equipment acquires M types of slot structures, needed to be dynamically informed, through a notification transmitted by the base station through the higher layer signaling.

15. The method according to claim 14, wherein the user equipment receives indication information containing ceil (log2(M)) bits through the group common PDCCH, and obtains the structures of one or more slots; and
when the user equipment obtains, through the higher layer signaling, M types of slot structures needed to be dynamically indicated, the user equipment obtains the regions included in each type of slot structures and the number of the OFDM symbols included in each region.

16. The method according to claim 9, wherein when the user equipment receives the structures of the slots indicated by the base station in the semi-static manner, uplink and downlink structures of each slot within N ms are configured through the higher layer signaling, and N is a positive integer more than 0.

17. An apparatus for indicating a slot structure, comprising:
a processor, configured to read a program in a memory and perform the following process: determining a structure of a slot;
a transceiver, configured to receive and transmit data under the control of the processor, and perform the following process:
indicating the structure of the slot to a user equipment in a dynamic or semi-static manner;

wherein the slot comprises a structure of one or a combination of the following regions: an uplink region, a downlink region, an unknown region, an empty region and a guard period region, each region comprising one or more Orthogonal Frequency Division Multiplexing (OFDM) symbols; wherein:

the uplink region is configured for transmission of uplink data;

the downlink region is configured for transmission of downlink data;

the unknown region is configured to allow the base station to perform related operations without any restrictions, and the user equipment side does not make any assumptions and not transmit and receive data on the OFDM symbols in the region before it receives Uplink (UL) grant or Downlink (DL) assignment sent by the base station;

the empty region is configured for transmission of no data; and the guard period region is configured for conversion of downlink to uplink, and provided by the base station side.

18. An apparatus for determining a slot structure, comprising:

a transceiver, configured to receive and transmit data under the control of the processor, and perform the following process:

receiving a structure of a slot, indicated by a base station to a user equipment in a dynamic or semi-static manner; and a processor, configured to read a program in a memory and perform the following process:

determining structures of one or more slots according to the indicated structure of the slot;

wherein the slot comprises a structure of one or a combination of the following regions: an uplink region, a downlink region, an unknown region, an empty region and a guard period region, each region comprising one or more Orthogonal Frequency Division Multiplexing (OFDM) symbols; wherein:

the uplink region is configured for transmission of uplink data;

the downlink region is configured for transmission of downlink data;

the unknown region is configured to allow the base station to perform related operations without any restrictions, and the user equipment side does not make any assumptions and not transmit and receive data on the OFDM symbols in the region before it receives Uplink (UL) grant or Downlink (DL) assignment sent by the base station;

the empty region is configured for transmission of no data; and the guard period region is configured for conversion of downlink to uplink, and provided by the base station side.

* * * * *